(12) United States Patent  
Sandberg et al.

(10) Patent No.: US 12,269,929 B2
(45) Date of Patent: Apr. 8, 2025

(54) METHOD OF PLASTICIZING AND DENSIFYING HYDROPHILIC POLYMERIC BIOMATERIALS AND HYDROPHILIC POLYMERIC BIOMATERIALS

(71) Applicant: Benedikt Matthias Neyses, Borås (SE)

(72) Inventors: Dick Sandberg, Växjö (SE); Benedikt Neyses, Skellefteå (SE)

( * ) Notice: Subject to any disclaimer, the term of this patent is extended or adjusted under 35 U.S.C. 154(b) by 745 days.

(21) Appl. No.: 17/595,368

(22) PCT Filed: May 18, 2020

(86) PCT No.: PCT/EP2020/063796
§ 371 (c)(1),
(2) Date: Nov. 15, 2021

(87) PCT Pub. No.: WO2020/234231
PCT Pub. Date: Nov. 26, 2020

(65) Prior Publication Data
US 2022/0185971 A1     Jun. 16, 2022

(30) Foreign Application Priority Data
May 23, 2019    (SE) ................... 1950612-0

(51) Int. Cl.
*C08J 3/18*      (2006.01)
*B27D 1/06*     (2006.01)
(Continued)

(52) U.S. Cl.
CPC ............ *C08J 3/18* (2013.01); *B27D 1/06* (2013.01); *C08J 7/02* (2013.01); *C08J 7/08* (2013.01); *C08L 97/02* (2013.01); *C08J 2397/02* (2013.01)

(58) Field of Classification Search
None
See application file for complete search history.

(56) References Cited

U.S. PATENT DOCUMENTS

| | | | | | |
|---|---|---|---|---|---|
| 4,005,039 | A | * | 1/1977 | Gardiner | ............... C08L 97/02 524/391 |
| 4,175,148 | A | * | 11/1979 | Luck | ................... B27N 7/00 156/331.7 |

(Continued)

FOREIGN PATENT DOCUMENTS

| | | |
|---|---|---|
| CA | 2805451 A1 | 12/2011 |
| CN | 103201332 A | 7/2013 |

(Continued)

OTHER PUBLICATIONS

Pre-treatment with sodium silicate, sodium hydroxide, ionic liquids or methacrylate resin to reduce the set-recovery and increase the hardness of surface-densified Scots pine, iForest 10, pp. 857-864, Oct. 26, 2017, Neyses et al. (Year: 2017).*

(Continued)

*Primary Examiner* — Peter A Salamon
(74) *Attorney, Agent, or Firm* — EVENTIDE LAW LLC (57) ABSTRACT

The present invention relates to a method of plasticizing and densifying hydrophilic polymeric biomaterial, said hydrophilic polymeric biomaterial having at least one surface, comprising the steps of softening the surface of the hydrophilic polymeric biomaterial to be compressed; compressing the hydrophilic polymeric biomaterial by applying an elevated pressure onto the softened surface of said hydrophilic polymeric biomaterial at an elevated temperature for a predetermined period of time; decreasing the temperature and thereafter the pressure applied to the hydrophilic polymeric biomaterial; wherein a plasticizing liquid is added to said surface of the hydrophilic polymeric biomaterial to be (Continued)

densified, the plasticizing liquid being a non-imidazolium-based ionic liquid (IL), an organic superbase or a Deep Eutectic Solvent (DES).

15 Claims, 3 Drawing Sheets

(51) Int. Cl.
    *B29C 71/02*     (2006.01)
    *C08J 7/02*     (2006.01)
    *C08L 97/02*     (2006.01)

(56) References Cited

U.S. PATENT DOCUMENTS

| | | | | |
|---|---|---|---|---|
| 4,276,329 | A * | 6/1981 | Vasishth | B27K 3/50 427/393 |
| 4,339,405 | A * | 7/1982 | Paszner | C08K 3/32 264/108 |
| 4,606,388 | A * | 8/1986 | Favot | B27K 5/04 144/380 |
| RE32,329 | E * | 1/1987 | Paszner | C08K 3/32 264/108 |
| 5,605,767 | A * | 2/1997 | Fuller | B32B 27/30 428/537.1 |
| 2009/0247432 | A1* | 10/2009 | Miller | C09K 8/60 507/240 |
| 2012/0028855 | A1* | 2/2012 | Miller | C09K 8/22 507/129 |
| 2016/0002358 | A1* | 1/2016 | Teixeira | C08B 1/003 435/165 |
| 2017/0129132 | A1* | 5/2017 | King | D21H 17/37 |
| 2017/0190850 | A1* | 7/2017 | Haverhals | D06M 23/10 |
| 2017/0233914 | A1* | 8/2017 | Haverhals | C09J 5/00 156/83 |
| 2018/0015635 | A1* | 1/2018 | Chen | C08G 59/245 |
| 2019/0203012 | A1* | 7/2019 | Shi | C08J 11/16 |

FOREIGN PATENT DOCUMENTS

| | | |
|---|---|---|
| CN | 103388272 B | 10/2015 |
| CN | 105592992 A | 5/2016 |
| CN | 109072542 A | 12/2018 |
| JP | 2009220279 A | 10/2009 |
| KR | 20070058739 A | 6/2007 |
| WO | 2011161326 A2 | 12/2011 |
| WO | 2014188080 A2 | 11/2014 |
| WO | 2016131828 A1 | 8/2016 |
| WO | 2017016589 A1 | 2/2017 |
| WO | 2017165891 A1 | 9/2017 |
| WO | 2018234638 A1 | 12/2018 |

OTHER PUBLICATIONS

Office Action for Chinese Application No. 202080037100.5; Issuing Date Jul. 8, 2023, pp. 1-22 (English translation).
Second Office action including a further Search Report for Chinese Patent Application No. 202080037100.5 dated Feb. 1, 2024, pp. 1-20, cited references listed on first page.
International Search Report and Written Opinion for PCT/EP2020/063796, mailed Sep. 18, 2020, 16 pages.
International Preliminary Report on Patentability for PCT/EP2020/063796, mailed Jun. 14, 2019, 15 pages.
Office action in Swedish application 1950612-0, dated Dec. 2, 2019, 9 pages.
Neyses, B., Rautkari, L., Yamamoto, A. & Sandberg, D. (2017). Pre-treatment with sodium silicate, sodium hydroxide, ionic liquids or methacrylate resin to reduce the set-recovery and increase the hardness of surface-densified Scots pine. iForest-Biogeosciences and Forestry, 10(5), 857-864.
Diez, V., DeWeese, A., Kalb, R. S., Blauch, D. N., & Socha, A. M. (2019). Cellulose Dissolution and Biomass Pretreatment Using Quaternary Ammonium Ionic Liquids Prepared from H-, G-, and S-Type Lignin-Derived Benzaldehydes and Dimethyl Carbonate. Industrial & Engineering Chemistry Research, 58(35), 16009-16017.
Domínguez de Maria, P. (2014). Recent trends in (ligno) cellulose dissolution using neoteric solvents: switchable, distillable and bio-based ionic liquids. Journal of Chemical Technology and Biotechnology, 89(1), 11-18.
Fang, C. H., Mariotti, N., Cloutier, A., Koubaa, A. & Blanchet, P. (2012). Densification of wood veneers by compression combined with heat and steam. European Journal of Wood and Wood Products, 70(1-3), 155-163.
Foksowicz-Flaczyk, J. & Walentowska, J. (2013). Antifungal activity of ionic liquid applied to linen fabric. International Biodeterioration & Biodegradation, 84, 412-415.
Gabrielli, C. P. & Kamke, F. A. (2010). Phenol-formaldehyde impregnation of densified wood for improved dimensional stability. Wood Science and Technology, 44(1), 95-104.
Gong, M., Lamason, C. & Li, L. (2010). Interactive effect of surface densification and post-heat-treatment on aspen wood. Journal of Materials Processing Technology, 210(2), 293-296.
Hanabusa, H., Izgorodina, E. I., Suzuki, S., Takeoka, Y., Rikukawa, M. & Yoshizawa-Fujita, M. (2018). Cellulose-dissolving protic ionic liquids as low cost catalysts for direct transesterification reactions of cellulose. Green Chemistry, 20(6), 1412-1422.
Inoue, M., Norimoto, M., Otsuka, Y. & Yamada, T. (1990). Surface compression of coniferous wood lumber. I. A new technique to compress the surface layer. Mokuzai Gakkaishi (Journal of the Japan Wood Research Society), 36(11), 969-975.
Inoue, M., Norimoto, M., Otsuka, Y., & Yamada, T., M. Tanahashi, M. & Rowell, R. M. (1993). Steam or heat fixation of compressed wood. Wood and Fiber Science, 25(3), 224-235.
Inoue, M., Sekino, N., Morooka, T., Rowell, R. M. & Norimoto, M. (2008). Fixation of compressive deformation in wood by pre-steaming. Journal of Tropical Forest Science, 273-281.
Kasprzak, D., Krystkowiak, E., Stępniak, I., & Galiński, M. (2019). Dissolution of cellulose in novel carboxylate-based onic liquids and dimethyl sulfoxide mixed solvents. European Polymer Journal, 113, 89-97.
Khakalo, A., Tanaka, A., Korpela, A., Hauru, L. K., & Orelma, H. (2019). All-wood composite material by partial fiber surface dissolution with an ionic liquid. ACS Sustainable Chemistry & Engineering, 7(3), 3195-3202.
Khalil, H. A., Dungani, R., Mohammed, I. A., Hossain, M. S., Aprilia, N. S., Budiarso, E. & Rosamah, E. (2014). Determination of the Combined Effect of Chemical Modification and Compression of Agatis Wood on the Dimensional Stability, Termite Resistance, and Morphological Structure. BioResources, 9(4), 6614-6626.
Kilpeläinen, I., Xie, H., King, A., Granstrom, M., Heikkinen, S. & Argyropoulos, D. S. (2007). Dissolution of wood in ionic liquids. Journal of Agricultural and Food Chemistry, 55(22), 9142-9148.
King, A. W., Asikkala, J., Mutikainen, I., Järvi, P. & Kilpeläinen, I. (2011). Distillable acid-base conjugate ionic liquids for cellulose dissolution and processing. Angewandte Chemie International Edition, 50(28), 6301-6305.
Kutnar, A., Sandberg, D. & Haller, P. (2015). Compressed and moulded wood from processing to products. Holzforschung, 69(7), 885-897.
Laine, K. (2014). Improving the properties of wood by surface densification. Doctoral dissertation. Aalto University Publication Series.
Laine, K., Rautkari, L. & Hughes, M, (2013a). The effect of process parameters on the hardness of surface densified Scots pine solid wood. European Journal of Wood and Wood Products, 71, 13-16.
Laine, K., Rautkari, L., Hughes, M. & Kutnar, A. (2013b). Reducing the set-recovery of surface densified solid Scots pine wood by hydrothermal post-treatment. European Journal of Wood and Wood Products, 71(1), 17-23.

(56) References Cited

OTHER PUBLICATIONS

Laine, K., Segerholm, K., Walinder, M., Rautkari, L., Ormondroyd, G., Hughes, M. & Jones, D. (2013c). Micromorphological studies of surface densified wood. Journal of Materials Science, 49(5), 2027-2034.
Lamason, C. & Gong, M. (2007). Optimization of pressing parameters for mechanically surface-densified aspen. Forest Products Journal, 57(10), 64.
Miyafuji, H. & Fujiwara, Y. (2013) Fire resistance of wood treated with various ionic liquids (ILs). Holzforschung, 67(7), 787-793.
Maki-Arvela, P., Anugwom, I., Virtanen, P., Sjöholm, R. & Mikkola, J. P. (2010). Dissolution of lignocellulosic materials and its constituents using ionic liquids—a review. Industrial Crops and Products, 32(3), 175-201.
Navi, P. & Heger, F. (2004). Combined densification and thermo-hydro-mechanical processing of wood. Materials Research Society, Bulletin, 29(5), 332-336.
Navi, P. & Sandberg, D. (2012). Thermo-Hydro-Mechanical Processing of Wood, EPFL Press, Lausanne, Switzerland, title page and pp. i-xii and 1-360.
Navi, P. & Pizzi, A. (2014). Property changes in thermo-hydro-mechanical processing. Holzforschung, 69(7), 863-873.
Neyses, B. (2016). Surface-Densified Wood—From Laboratory-Scale Research Towards a Competitive Product. Licentiate Thesis, Luleå University of Technology, pp. 1-98 in pdf.
Neyses, B., Hagman, O., Sandberg, D. & Nilsson, A. (2016). Development of a continuous wood surface densification process: the roller pressing technique. In: International Convention of Society of Wood Science and Technology: Forest Resource and Products: Moving Toward a Sustainable Future (pp. 17-24). Society of Wood Science and Technology.
Niemz, P. & Stübi, T. (2000). Investigations of hardness measurements on wood based materials using a new universal measurement system. In: Proceedings of the symposium on wood ma-chining, properties of wood and wood composites related to wood machining, Vienna, Austria, pp. 1-320 in pdf.
Ou, R., Xie, Y., Wang, Q., Sui, S. & Wolcott, M. P. (2014). Thermoplastic deformation of poplar wood plasticized by ionic liquids measured by a nonisothermal compression technique. Holzforschung, 68(5), 555-566.
Parviainen, A., King, A. W., Mutikainen, I., Hummel, M., Selg, C., Hauru, L. K., Sixta, H. & Kilpeläinen, I. (2013). Predicting cellulose solvating capabilities of acid-base conjugate ionic liquids. ChemSusChem, 6(11), 2161-2169.
Parviainen, A. P. (2016). Acid-base conjugate ionic liquids in lignocellulose processing: synthesis, properties and applications. Doctoral thesis. Laboratory of Organic Chemistry, Department of Chemistry, Faculty of Science, University of Helsinki, Finland, pp. 1-74 in pdf.
Patachia, S., Croitoru, C. & Friedrich, C. (2012). Effect of UV exposure on the surface chemistry of wood veneers treated with ionic liquids. Applied Surface Science, 258(6), 723-729.
Pernak, J., Zabielska-Matejuk, J., Kropacz, A. & Foksowicz-Flaczyk, J. (2004). Ionic liquids in wood preservation. Holzforschung, 58, 286-291.
Pfriem, A., Dietrich, T. & Buchelt, B. (2012). Furfuryl alcohol impregnation for improved plasticization and fixation during the densification of wood. Holzforschung, 66(2), 215-218.
Pizzi, A., Leban, J. M., Zanetti, M., Pichelin, F., Wieland, S. & Properzi, M. (2005). Surface finishes by mechanically induced wood surface fusion. Holz als Roh-und Werkstoff, 63(4), 251-255.
Rautkari, L., Properzi, M., Pichelin, F. & Hughes, M. (2009). Surface modification of wood using friction. Wood Science and Technology, 43(3-4), 291-299.
Rieland, J. M., & Love, B. J. (2020). Ionic liquids: A milestone on the pathway to greener recycling of cellulose from biomass. Resources, Conservation and Recycling, 155, 104678, pp. 1-11.
Samikannu, R., Shukla, S. K., Samikannu, A., & Mikkola, J. P. (2019). Lutidinium-based ionic liquids for efficient dissolution of cellulose. New Journal of Chemistry, 43(5), 2299-2306.
Sandberg, D., Haller, P. & Navi, P. (2013). Thermo-hydro-mechanical (THM) wood treatments. Wood Material Science and Engineering, 8(1),64-88.
Schuerch, C., Burdick, M. P. & Mahdalik, M. (1966). Liquid ammonia-solvent combinations in wood plasticization. Chemical treatments. Industrial & Engineering Chemistry Product Research and Development, 5(2), 101-105.
Swatloski, R. P., Spear, S. K., Holbrey, J. D. & Rogers, R. D. (2002). Dissolution of cellulose with ionic liquids. Journal of the American Chemical Society, 124(18), 4974-4975.
Zavrel, M., Bross, D., Funke, M., Buchs, J. & Spiess, A. C. (2009). High-throughput screening for ionic liquids dissolving (ligno-) cellulose. Bioresource Technology, 100(9), 2580-2587.
Zhang, J., Wu, J., Yu, J., Zhang, X., He, J. & Zhang, J. (2017). Application of ionic liquids for dissolving cellulose and fabricating cellulose-based materials: state of the art and future trends. Materials Chemistry Frontiers, 1(7), 1273-1290.
Office action for European Application No. 20 727 949.8 dated Mar. 16, 2023.

\* cited by examiner

METHOD OF PLASTICIZING AND DENSIFYING HYDROPHILIC POLYMERIC BIOMATERIALS AND HYDROPHILIC POLYMERIC BIOMATERIALS

TECHNICAL FIELD

The present invention relates to the field of densifying hydrophilic polymeric biomaterials, in particular low-density wood species.

BACKGROUND ART

The surface densification of wooden boards has in recent years become a subject of increasing interest. Creating a layer of densified wood cells a few millimetres thick just beneath the surface can lead to a twofold increase in hardness (Gong et al. 2010, Laine et al. 2013a), and opens up new opportunities for the use of low-density wood species in high-value products such as wooden flooring or window frames.

In general, the densification process consists of three stages: softening of the wood cells, followed by the actual compression, and finally solidification of the compressed wood in order to prevent elastic spring-back and moisture-induced set-recovery (Sandberg et al. 2013). During the past decades, many different methods for densification have been studied, as well as the effect of the densification process parameters on the wood properties. The first published study of the surface densification of wood was probably conducted by Tarkow et al. (1968). In 1990, Inoue et al. reported a rather complicated technique that involved cutting grooves in the wood surface to facilitate softening with water. Pizzi et al. (2005) used friction welding equipment for surface densification, and a similar principle was employed by Rautkari et al. (2009), who found a positive correlation between the level of densification by a friction welding method and the hardness. More recently, most studies have used a hot press of a batch type with a cooling system, where the combination of moisture and heat plasticizes, or at least softens the wood enough for an easy deformation of the wood cells, and densifies the wood surface. Laine et al. (2013a) used this method to obtain an almost twofold increase in Brinell hardness. An even greater increase in hardness was achieved by softening the wood in boiling water before the densification (Lamason & Gong 2007).

The surface densification process in a hot press takes only a few minutes (Laine 2014) and is therefore—in principle—suitable for transformation into an industrial process (Neyses et al. 2016). However, the major obstacle preventing the widespread commercialisation of surface-densified wood products is perhaps the elastic spring-back and in particular the set-recovery of the compressed wood cells after exposure to moisture. The elastic spring-back—which occurs immediately when the compression force is released—is greatly reduced by introducing a cooling stage to reach a temperature of the densified wood below 80° C. before the pressure is released (Neyses 2016). The moisture-induced set-recovery can be eliminated by chemical modification, by impregnation with resin, or by a thermo-hydro-mechanical post-treatment (Kutnar et al. 2015). Already in the early 1990s, Inoue et al. (1993) showed that the set-recovery can be virtually eliminated by post-steaming of the compressed wood at 200° C. for 1 minute or at 180° C. for 8 minutes. Similar results were reported by Navi & Heger (2004). Kutnar et al. (2012) almost eliminated the set-recovery by carrying out the densification process in a closed system under saturated steam conditions at 170° C. Similar effects were observed in other studies (Fang et al. 2006, Inoue et al. 2008, Gong et al. 2010). Laine et al. (2012) showed that thermal post-treatment almost eliminates the set-recovery, albeit with a process time of several hours. Other studies successfully employed impregnation treatment, mainly by using conventional adhesives or resins as additives, to reduce the set-recovery (Stamm 1964, Gabrielli and Kamke 2010, Pfriem et al. 2012, Khalil et al. 2014). Unfortunately, these established methods are either very time-consuming or difficult to translate into a continuous process, and at the same time they often give rise to environmental concerns.

One of the major theories describing the underlying mechanisms of the elastic spring-back and set-recovery was presented by Navi and Sandberg (2012) and further described by Navi and Pizzi (2014), who suggested that the set-recovery is due to the elastic recovery of deformation of crystalline cellulose, which is 'frozen' inside the plastically deformed matrix of lignin and hemicellulose. A re-softening of the matrix after it has been densified, e.g. through moisture, leads to a recovery of the elastic deformation in the crystalline cellulose. Our hypothesis is that the set-recovery will be greatly reduced if a plastic deformation of the crystalline cellulose can be achieved in the initial plasticization/softening stage before densification. This is, however, difficult to accomplish with the existing methods of plasticizing/softening wood, such as the combination of moisture and heat, or treatment with gaseous ammonia (Schuerch et al. 1966).

SUMMARY OF THE INVENTION

The object of the present invention is to provide a method for densifying hydrophilic polymeric biomaterials, wherein said method is industrially advantageous. Furthermore, it is an object of the present invention to provide a method for densifying hydrophilic polymeric biomaterials, which said method decreases the set-recovery and spring-back, while increasing the hardness of the densified hydrophilic polymeric biomaterials. Furthermore, it is an object to provide a method for the plasticization of an accurately defined volume of a piece of the hydrophilic polymeric biomaterial, e.g. a surface region of sawn timber to a certain depth, so that the following densification can be delimited to that defined volume.

According to a first aspect, the object is attained by providing a continuous, half-continuous or static method of plasticizing and densifying hydrophilic polymeric biomaterials having at least one surface, comprising the steps of:
 a) providing the hydrophilic polymeric biomaterial;
 b) softening said surface of the hydrophilic polymeric biomaterial to be compressed by applying heat to increase the temperature of the hydrophilic polymeric biomaterial;
 c) compressing the hydrophilic polymeric biomaterial by applying an elevated pressure onto the softened surface of said hydrophilic polymeric biomaterial obtained in step b) at an elevated temperature for a pre-determined period of time;
 d) decreasing the temperature applied to the hydrophilic polymeric biomaterial;
 e) decreasing the pressure applied to the hydrophilic polymeric biomaterial;
 wherein a plasticizing liquid is added to said surface of the hydrophilic polymeric biomaterial to be densified, before step b), such that said liquid penetrates said surface during step b), and wherein the plasticizing liquid is a non-imidazolium-based ionic liquid (IL), an organic superbase or a Deep Eutectic Solvent (DES).

The non-imidazolium-based ionic liquid (IL) may be made from amidine- or guanidine-based cations combined with a carboxylic acid.

The plasticizing liquid may be recovered from the hydrophilic polymeric biomaterial before, during or after the compression thereof.

Step b) may be performed by applying water steam and/or heat to the surface of the hydrophilic polymeric biomaterial for a period of time sufficient to soften said surface to a predetermined depth.

Step b) may be performed by direct heating, hot plate heating, steam heating, boiling in water, or dielectric heating, preferably by direct heating, hot plate heating or dielectric heating.

Step b) may further comprise puncturing the surface of the hydrophilic polymeric biomaterial at multiple locations to provide multiple punctuations on said surface, in order to facilitate the penetration of the plasticizing liquid into the material to a predetermined depth.

The punctuations may comprise holes that have a depth of 1-5 mm, preferably 2-4 mm, even more preferably 3-4 mm, said holes having a diameter of about 0.1-1.0 mm, preferably 0.1-0.5 mm and more preferably 0.2 mm.

The elevated temperature in step c) may be within the range of about 80-270° C., preferably less than 250° C., even more preferably less than 200° C.

The hydrophilic polymeric biomaterial may be wood, wood-based materials, and/or other lignocellulosic materials. Furthermore, the hydrophilic polymeric biomaterial may be of a low-density wood species, wherein said low-density wood species may be a low-density softwood or a low-density hardwood. The low-density wood species may be chosen from a species having a dry density that is lower than 600 kg/m$^3$ before treatment. The hydrophilic polymeric biomaterial may be in the form of a sawn timber, a log, a plank, a board, a veneer, and/or a wafer.

In one embodiment, the hydrophilic polymeric biomaterial has at least one surface, possibly two or more surfaces, and a core, and said hydrophilic polymeric biomaterial is plasticized and densified on any or all surfaces thereof, and optionally, is additionally plasticized and densified at the core of the hydrophilic polymeric biomaterial, such that an entire piece of hydrophilic polymeric biomaterial being treated is compressed and plasticized.

According to a second aspect, a densified hydrophilic polymeric biomaterial is provided, said densified hydrophilic polymeric biomaterial having been compressed and plasticized by the method according to the first aspect and any embodiments thereof.

According to an embodiment of the densified hydrophilic polymeric biomaterial, substantially no plasticizing liquid is present in the densified hydrophilic polymeric biomaterial obtained by the method according to the first aspect.

DEFINITIONS

As used herein, the term "ionic liquid" refers to a salt, comprising at least one cation and at least one anion, said salt being in liquid form at temperatures below 100° C. The ionic liquid (IL) may be in liquid form below 50° C., 40° C., 30° C., 25° C., or 20° C. Some ILs have melting points below room temperature; some of them even have melting points below 0° C. An IL has a low degree of symmetry. Furthermore, the charge of the cation as well as the charge of the anion is distributed over a larger volume of the molecule by resonance. As a consequence, solidification of the IL will take place at lower temperatures.

As used herein, the term "first-generation IL" refers to ILs where the cations are typically organic, and may be for instance imidazolium, pyridinium, pyrroldinium, phosphonium, ammonium, and sulfonium, and where the anions may be organic or inorganic. An organic anion may be for instance alkylsulfate, tosylate or methanesulfonate. An inorganic anion may be for instance bis(trifluoromethylsulfonyl) imide, hexafluorophosphate, tetrafluoroborate or a halide such as fluoride ($F^-$), chloride (Cl—), bromide ($Br^-$), iodide ($I^-$) and astatide ($At^-$).

As used herein, the term "organic superbase" refers to an organic, extremely basic compound or caustic substance that has a high affinity for protons. It has been defined as an organic compound whose basicity is greater than that of a proton sponge, which has a conjugate pKa of 12.1. Organic superbases are almost always charge-neutral, nitrogen-containing species. Despite enormous proton affinity, organic superbases exhibit low nucleophilicity. They include phosphazenes, amidines, and guanidines. Other organic compounds may also meet the physicochemical or structural definitions of a "superbase". Proton chelators like the aromatic proton sponges and the bispidines are also superbases.

As used herein, term acid-base conjugate IL refers to relatively novel class of ILs, which usually consist of a mixture of an organic superbase with a carboxylic acid. ILs of this type are distillable, they can rapidly dissolve cellulose to high concentrations and they can be recovered from the cellulose material with recovery rates of more than 99% (King et al. 2011). The term acid-base conjugate ILs also includes so-called "switchable" ILs, in which an organic superbase and an alcohol is bubbled with gaseous $CO_2$ in ambient pressure and room temperature to produce an IL. By bubbling nitrogen or argon gas through the solution, the IL can be reverted back into its initial components (Parviainen 2016). In comparison to first-generation ILs, acid-base conjugate are less expensive, more environmentally friendly, and more easily recovered for reuse.

As used herein, the term "Deep Eutectic Solvent" (DES) refers to a relatively novel class of chemicals that can function as solvents, reactants, and catalysts. DESs are often classified as ionic liquids, although they can also be obtained from non-ionic species. In general, DESs are attained by complexation of the halide salt of quaternary ammonium or phosphonium cation (as the hydrogen bond acceptor, HBA) along with a hydrogen bond donor (HBD), for example, urea, glycerol, or ethylene glycol. A characteristic property of DESs is that they exhibit a lower melting point compared to either HBA or HBD because the strong hydrogen bonding prevents the parent components from crystallizing. Compared to ionic liquids and first-generation ILs in particular, DESs exhibit certain advantages, such as easy preparation from two or more components without the need for separate purification steps. DESs can be obtained from readily available, bio-based, inexpensive, low-toxicity materials, which can be regenerated in some cases. As a result, DESs have a price-level an order of magnitude lower than that of first-generation ILs. Although DESs exhibit higher toxicity compared to some of their individual components, DESs have relatively low toxicity, are biodegradable, and have low vapour emissions. These properties make DESs one of the most promising solvents and chemicals for sustainable material production.

As used herein the term "hydrophilic polymeric biomaterial" includes wood, wood-based materials, and other lignocellulosic materials. As used herein, wood is a complex polymeric structure consisting of lignin and carbohydrates, i.e. cellulose and hemicelluloses, which form the visible lignocellulosic structure of wood in any form and/or shape, i.e. fibres, particles, chips, wafers, veneer or sawn timber. Examples of wood-based materials are MDF (Medium Density Fibreboard), particleboard, OSB (Oriented strand board), plywood, and cross-laminated timber. An example of other lignocellulosic materials are dry matter or biomass comprising primarily cellulose and lignin such as bamboo and reed canary grass. There is a strong relationship between the properties of a hydrophilic polymeric biomaterial, such as wood, and the properties of the particular tree or plant that yielded it. The density of wood varies with species, within species and even within a tree. The density of a hydrophilic polymeric biomaterial correlates with its hardness and other mechanical properties. The hydrophilic polymeric biomaterial, and in particular wood, may be in the form of a sawn timber, a log, a plank, a board, a veneer, a wafer and/or a particle. Within the present disclosure, the term "wood" will often be used as this is the material most commonly subject to a densification process, but this should not be regarded as limiting, as the scope of the invention cover hydrophilic polymeric biomaterials as defined above.

As used herein, the term "densification" or "densifying" refers to the process of softening the material, compressing or in other ways shaping the material, and subsequently solidifying the material to prevent the material from returning to an original shape, i.e. the material has been shaped under plastic deformation. For simplicity, hereinafter the term "compressing" is used for the shaping step, but this may thus entail another form of shaping of the material in question. In general, plastic deformation is irreversible. An object in the plastic deformation range will first, however, have undergone elastic deformation, which is reversible, so the object will return part way to its original shape when the force causing the deformation is removed. This phenomenon is termed spring-back.

As used herein the term "spring-back" refers to the geometric change made to a material at the end of a forming process when the material is released from the forces of the forming tool, and the capacity or tendency of a bent or shaped elastic material to at least partly revert its elastic deformation. Alternatively, the term "elastic spring-back" may be used. This is a common problem seen within the field of shaped wood, of which the skilled person is well aware.

A "plasticizer" is an additive that increases the ductility or decreases the viscosity of a material, i.e. a plasticizer softens the material but does not necessarily make it plastically formable.

The plasticizer can either be "weak" or "strong". A weak plasticizer softens the material to allow large deformations without destroying the macro-structure, but the deformation is not purely plastic.

In practice, the process means that a material, such as wood, is treated with a weak plasticizer, where after the material is compressed, and thereby densified. Thereafter some kind of solidification needs to be performed so that the elastic component of the densification is "frozen" in quasi-stable state, and the material stays densified and does not return back to its original shape before the material was softened and compressed. The process of densification is well known within the technical field and commonly used to increase the density of wood or wood-based materials such as plywood, particleboard and MDF. When re-plasticized, a material deformed by a weak plasticizer will recover back to its original shape.

A strong plasticizer allows the deformation of a material in a purely plastic way, with the elastic component being absent or negligible. A material deformed by a strong plasticizer will remain stable over time, even upon re-plasticization.

Hydrophilic polymeric biomaterials such as wood can, unlike e.g. metals, exhibit "virtual plastic deformation", which means that after shaping by a process similar to herein defined as "densification", the wood can behave as "plastic deformed" until it is exposed to elevated moisture or heat conditions, or exposed to other treatments that change the internal molecular balance, resulting in a reshaping towards its original shape. This phenomenon is termed set-recovery.

As used herein the term "set-recovery" refers to a process where shaped wood, upon exposure to e.g. water or moisture, will return towards its original shape. This is a common problem seen within the field of softened and shaped wood, of which the skilled person is well aware.

As used herein the term "shaped wood" refers to wood, whose shape has been changed by compression, densification, tension, bending, or moulding.

As used herein "plasticizing liquid" is a liquid used during the densification process to facilitate the softening and plasticization of the material and/or to help in solidifying or densifying the material, which will reduce or eliminate the spring-back and/or the set-recovery effects.

DETAILED DESCRIPTION

Figure 1:
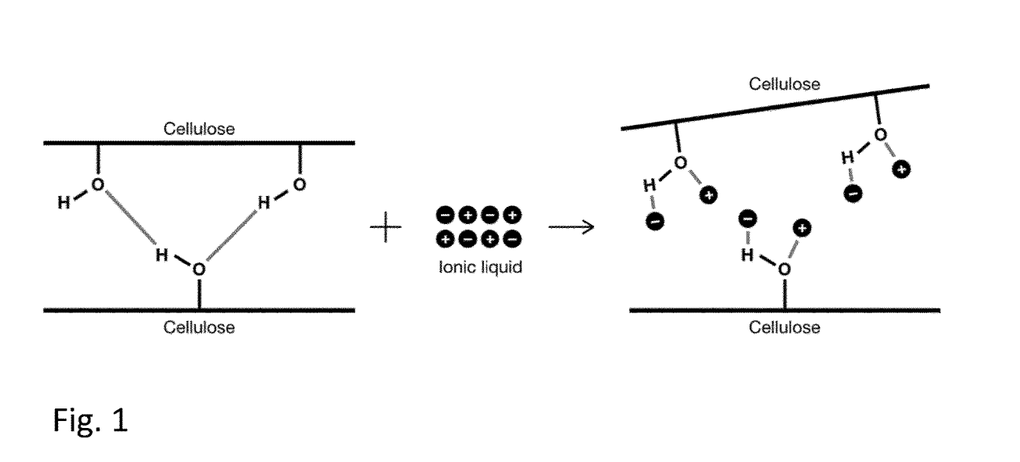
FIG. 1: Proposed mechanism of cleaving hydrogen bonds between cellulose chains with ionic liquids.

In the beginning of the 21st century, the possibility of dissolving and plasticizing cellulose by treatment with so-called ionic liquids (ILs) was reported (Swatloski et al. 2002, Kilpelainen et al. 2007). As mentioned above, an IL is a salt that is liquid at temperatures normally below 100° C. (Hanabusa et al. 2018), which means that it consists of ions instead of electrically neutral molecules. Apart from being considered to be 'green solvents' of cellulose, ILs are reported to have positive effects on antifungal and antimicrobial activity, and on the fire resistance and UV-stability of wood (Pernak et al. 2004, Foksowicz-Flaczyk and Walentowska 2012, Patachia et al. 2012, Miyafuji and Fujiwara 2013). The first generation of ILs that were used to dissolve cellulose usually consist of imidazolium-based cations, often combined with a halogen anion, such as chloride or bromide. Zhang et al. (2017) reported a mechanism that relies on the synergetic effect of the cations and anions to cleave the hydrogen bonds between cellulose chains (FIG. 1). The small anions of for instance 1-ethyl-3-methylimidazolium chloride, interact with the hydrogen atoms of the cellulose hydroxyl groups, whereas the larger imidazolium cations bond with the oxygen atoms that are less sterically hindered. Ou et al. (2014) reported that IL treatment transforms wood into a thermoplastic material, without or with only a very small elastic deformation under load. This suggests that the elastic spring-back and the set-recovery can largely be reduced, i.e. the IL acts as a strong plasticizer.

Imidazolium-based ILs are highly effective cellulose solvents, but they are also expensive (Hanabusa et al. 2018). For this reason, many researchers have started to focus on finding cheaper alternatives, and several studies have explored the potential of ILs made from amidine- or guanidine-based cations, combined with a carboxylic acid as the anion, e.g. propionic acid or acetic acid (King et al. 2011). Due to their high basicity, these amidines and guanidines are also known as organic superbases (Ichikawa 2009). Such ILs are known as acid-base conjugate ILs. Parviainen et al. (2013) and Hanabusa et al. (2018) reported that this new generation of ILs is considerably cheaper and easier to recycle than imidazolium-based ILs, while maintaining the power of dissolving cellulose (Maki-Arvela et al. 2010, Dominguez de Maria 2014). As wood is itself somewhat acidic, a pre-treatment with only the amidine or guanidine component as cation was tested in the present study, to see whether an IL in-situ with the wood's acid groups as anions will be formed. The in-situ IL would then plasticize the cellulose.

Figure 4:
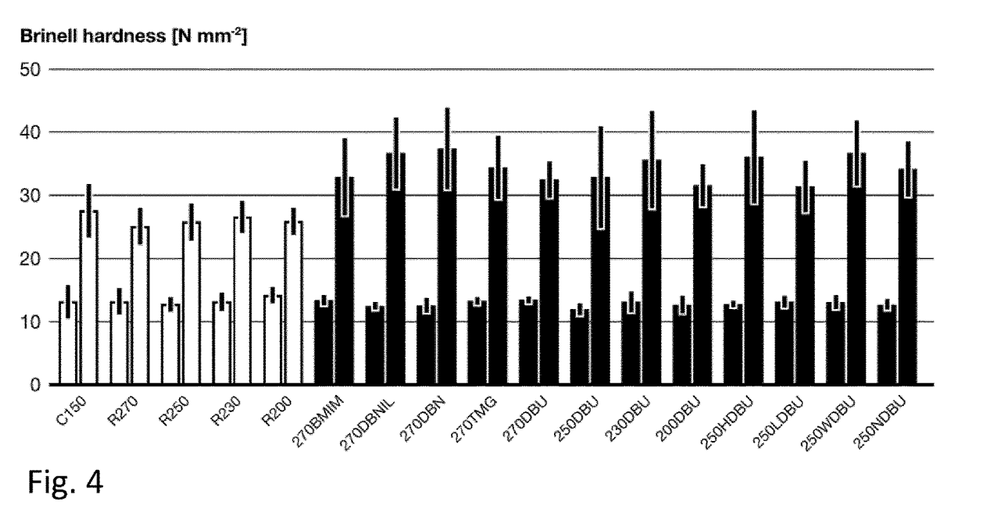
FIG. 4: Average Brinell hardness before (left-handed bar) and after (right-handed bar) densification. The error bars show ±1 standard deviation.

The inventors hypothesized that the IL pre-treatment will increase the hardness of the densified wood surface in comparison with wood softened with heat and moisture and thereafter densified (FIG. 4). The reasons are expected to be twofold: firstly, an overall higher level of "strong" plasticization in comparison with softening wood with heat and moisture, resulting in a more intense densification, and secondly, for untreated wood, the heated press platen will quickly dry the outermost wood surface upon contact, and reduce the level of softening of this region. As a result, the density peak after densification will be somewhat below the surface. However, for IL-treated wood, moisture is not needed to reach the maximum level of softening, and this will move the density peak towards the outermost region of the wood surface. This proposed effect originates from an analysis of the strain vs. time curve of Brinell hardness testing reported in a previous study (Neyses et al. 2017). The hypothesis was confirmed in the experiments conducted, as is evident from the Experimental section below.

Thus, the purpose of the study disclosed in the experimental section below was to evaluate the effect of IL and organic superbase pre-treatments on the elastic spring-back, set-recovery and Brinell hardness of surface-densified wood. Various combinations of chemical compounds, solution concentrations and densification temperatures were tested. As Deep Eutectic Solvents (DES) may also be classified as ionic liquids, as disclosed in the Definitions section above, also DES are included in the scope of the present disclosure. The method according to the present disclosure is a continuous, half-continuous or static method of plasticizing and densifying hydrophilic polymeric biomaterials having at least one surface. Said method comprises the steps of
  a) providing the hydrophilic polymeric biomaterial;
  b) softening the surface of the hydrophilic polymeric biomaterial to be compressed by applying heat to increase the temperature of the hydrophilic polymeric biomaterial;
  c) compressing the hydrophilic polymeric biomaterial by applying an elevated pressure onto the softened surface of said wood obtained in step b) at an elevated temperature for a pre-determined period of time;
  d) decreasing the temperature applied to the hydrophilic polymeric biomaterial;
  e) decreasing the pressure applied to the hydrophilic polymeric biomaterial;
  wherein a plasticizing liquid is added to said surface of the hydrophilic polymeric biomaterial to be densified, before step b, such that said liquid penetrates said surface during step b, and wherein the plasticizing liquid is a non-imidazolium-based ionic liquid (IL), an organic superbase or a Deep Eutectic solvent (DES).

The softening of the hydrophilic polymeric biomaterial may be performed on at least one surface for a predetermined amount of time, such that a first external part, intended to be compressed and thereby densified, will be softened to a predetermined depth below the surface, while a core below the first external part may not be softened and thereby not densified during the subsequent compressing step. It is further possible to soften only one surface of the material, a first external part, when said material has more than one surfaces, while subsequent, such as second, third, fourth, etc., external parts are not softened. Thereby only one surface of several surfaces is softened and consequently densified by the method herein. It is also possible to soften the material throughout the entire material, such that all parts of the material, both the first external part and optionally subsequent external parts, as well as a core, is softened, whereby a compression leads to the entire material being compressed and densified throughout its entire depth. The latter approach will lead to a more dense material than the first mentioned approaches. The skilled person is able to determine the amount of time a specific material needs to be heated in order to soften said material in step b), as well as the pressure and temperature needed in order for the softened material to be compressed and densified in step c).

By using an IL, an organic superbase or a DES as the plasticizing liquid, the plasticizing liquid is not consumed. Thus, it may be recycled, as it may be collected during or after the compression of the material, and reused in subsequent batches. Once the hydrophilic polymeric material is softened by the combination of the plasticizing liquid and heat, the hydrogen bonds between the cellulose chains will be cleaved, and remain so until the material is densified and new bonds can form with the help of the pressing energy. For this reason it is not necessary to keep the plasticizing liquid in the hydrophilic polymeric biomaterial in order to achieve the desired reduction in set-recovery. This theory is supported by (Khakalo et al. 2019). Hence, the plasticizing liquid can be evacuated from the material during or after the compression and may be reused. It is probably possible to recover at least 80%, or at least 85%, or at least 90% of the plasticizing liquid during the method of the present disclosure. Thus, the plasticizing liquid can thereafter be reused in processing subsequent batches of hydrophilic polymeric biomaterial. Thereby, the method of the present disclosure is cost-efficient. It is also an environmental advantage that the plasticizing liquid may be reused, as less resources for providing new plasticizing liquid are needed, as compared to using glue or resins or the like for the reduction of springback and set-recovery of the material, which have to be provided in new batches for every time the methods of the prior are being performed. The IL, DES or organic superbase are not consumed, or consumed to a low degree, by performing the method of the present disclosure, whereas a resin or a glue or other hardening agent are consumed in conventional methods.

Furthermore, the methods according to the prior art use for instance a glue, a resin, maltodextrin, or another hardening agent, which hardens within the hydrophilic polymeric biomaterial and thus remains therein. It is thus the glue, resin, maltodextrin, or other hardening agent, that keeps the material compressed and the material densified in the prior art. In contrast, by using the method of the present disclosure, the plasticizing liquid will substantially be absent from the resulting compressed hydrophilic polymeric biomaterial, and the hardening of the treated hydrophilic polymeric biomaterial is only due to the compression process, not a hardened substance therein. Once the hydrogen bonds between the cellulose chains have been broken, as explained above, the plasticizing liquid is no longer of use, and may thus be evacuated from the material. The compression during an elevated pressure and elevated temperature is sufficient to compress and densify the material having broken hydrogen bonds. Without being bound thereto, one theory is that hydrogen bonds will be reformed within the material in the compressed state during the compression step in a new arrangement so that the compressed form will stay compressed even when the increased pressure and temperature is removed.

Yet another advantage with using the method according to the present disclosure is that there is no risk of leaching during the service life of the densified product, as the plasticizing liquid in principle will not remain within the material after completion of the method. Hence, there is no hardening agent within the material that risks leaching out of the material.

Consequently, provided by the present disclosure is also a densified hydrophilic polymeric biomaterial that has been densified by the method of the present disclosure. Said densified hydrophilic polymeric biomaterial does not comprise any resins, glue or other hardening agents such as maltodextrin. Said densified hydrophilic polymeric biomaterial comprises substantially no hardening agents. Consequently, a densified hydrophilic polymeric biomaterial is obtained that comprises substantially no plasticizing liquid after completion of the method of the present disclosure.

By using the method of the present disclosure, it is not necessary to take the fibre direction of the hydrophilic polymeric biomaterial into account when entering the hydrophilic polymeric biomaterial into the process. Therefore, it is not essential to control the direction of the fibres in the hydrophilic polymeric biomaterial when being fed into, for instance, an automated system for performing the method of the present disclosure. Thus, it is easy to scale up a process of the method and to make a continuous or half-continuous process of the method, as well as a static process of the method. The softening of the hydrophilic polymeric biomaterial is traditionally performed by applying water steam or heat to the surface of the hydrophilic polymeric biomaterial for a period of time sufficient to soften the surface to a predetermined depth. The softening may further be performed by direct heating, hot plate heating, steam heating, boiling in water, or dielectric heating. Conventional steps for softening hydrophilic polymeric biomaterials are well-known to the skilled person. According to the present disclosure, it is preferred to perform the softening by direct heating, hot plate heating or dielectric heating. This is as a water steam-based softening may decrease the efficiency of the plasticizing liquid in the present process.

By plasticizing the hydrophilic polymeric biomaterial with any of the plasticizing liquids mentioned herein, a method is obtained that will allow the user to define the volume of the hydrophilic polymeric biomaterial to be densified. For instance, the hydrophilic polymeric biomaterial may be soaked in the plasticizing liquid. By controlling the soaking period of the material in the plasticizing liquid, in terms of amount of time, the penetration of the liquid into the material, and thus depth of the material that is plasticized, may be controlled and defined. Furthermore, it is possible to control the heat in terms of the elevated temperature that is applied to the material, and/or the amount of time the elevated temperature is applied, in order to control and define the volume that is to be densified by the present method. This is a particular advantage when a surface densification is desired, such as densification of a part of sawn timber. Furthermore, it seems that the plasticizing of hydrophilic polymeric biomaterial using the plasticizing liquids mentioned herein is stronger than in prior art. In the process of plasticizing and densifying hydrophilic polymeric biomaterial, unless the entire material is plasticized, there is always a transition zone between hydrophilic polymeric biomaterial having been plasticized and hydrophilic polymeric biomaterial having not been plasticized. By use of the method according to the present disclosure, this transition zone may be minimized as compared to using methods according to the prior art. A smaller or narrower transition zone is advantageous as the transition zone in itself is not a completely densified zone, and thus prone to increased levels of set-recovery.

It is possible to puncture the surface of the hydrophilic polymeric biomaterial at multiple locations to provide multiple punctuations on said surface, in order to facilitate the softening of the material and the penetration of the plasticizing liquid into said surface to a predetermined depth of the material. The punctuations comprises holes that have a depth of 1-5 mm, preferably 2-4 mm, even more preferably 3-4 mm, said holes having a diameter of about 0.51-1.0 mm, preferably 0.8 mm-0.5 mm and more preferably 0.1-0.2 mm. Said punctuation may thus enable the plasticizing liquid to penetrate either only the first external part of the hydrophilic polymeric biomaterial, or throughout an entire piece of hydrophilic polymeric biomaterial, including both the first external part and a core of the hydrophilic polymeric biomaterial, as mentioned above.

By using the method according to the present disclosure, the inventors have seen that the set-recovery of the compressed wood is substantially decreased. As shown in the Experimental section below, wood specimens treated according to the method of the present disclosure, exhibited a significantly reduced set-recovery, as compared to wood specimens treated by the same steps but without a plasticizing liquid in the form of an ionic liquid or organic superbase. Interestingly, it could be shown by the inventors that the more affordable acid-base conjugate ILs achieve at least as much of a reduction in set-recovery as the first-generation imidazolium-based ILs. In fact, all ILs and organic superbases presented in the experimental section below have a vastly stronger effect than the IL tested in an earlier study, which is not included in the present invention (Neyses et al. 2017).

Hydrophilic polymeric biomaterial treated with a polymerizing resin and then densified according to prior art, can exhibit a strong reduction in set-recovery (Gabrielli et al. 2010) and an increase in hardness over densified wood without such a treatment (Pfriem et al. 2011). The increase in hardness can be nearly as high as achieved by the method according to the present disclosure (Furfuryl alcohol impregnation with 33.9% weight percentage gain). However, methods such as the ones reported by Gabrielli et al. (2010) and Pfriem et al. (2011) consume a large amount of time and material resources. The resin treatments require a closed system, i.e. an autoclave/pressure vessel and take several hours. Furthermore, because of the need for a closed-system, the process cannot be carried out in a continuous manner. As previously mentioned above, the resins remain in the densified material and are not recovered.

By using the method according to the present disclosure, the inventors have further observed a decreased spring-back. Wood treated with the methods according to the prior art may have an elastic spring-back of about 10-20%. Hydrophilic polymeric biomaterial having been treated according to the present invention shows an elastic spring-back of about 0-5%, or 0±3%, meaning that the spring-back is smaller than the uncertainty of the measurement procedure.

The hardness of the hydrophilic polymeric biomaterial treated with the method of the present disclosure is significantly increased. As shown in the experimental section below, wood specimens treated according to the method of the present invention showed a significant increase in Brinell Hardness, as compared to wood specimens treated by the same steps but without a plasticizing liquid in the form of an ionic liquid or organic superbase.

A further advantage of the method of the present disclosure is that the temperature used in the compressing step of the method, step c), may be decreased. By use of the present method, the temperature applied during compression may be lower than in prior art, such as 80° C.-270° C., or 100° C.-270° C., preferably less than 250° C., more preferably less than 200° C., and the temperature may even be less than 150° C. or less than 100° C.

As stated above under "Definitions", the hydrophilic polymeric biomaterial may be wood, wood-based materials, and other lignocellulosic materials. The hydrophilic polymeric biomaterial may be in the form of a sawn timber, a log, a plank, a board, a veneer, a wafer and/or a particle. Preferably, the hydrophilic polymeric biomaterial is of a low-density wood species. However, also high-density species may be subjected to the present method in order to increase their hardness and/or density even further.

Low-density wood species that may be densified by the present method may be chosen from any so-called softwood or hardwood. The low-density wood species is preferably chosen from a species having a dry density that is lower than 600 kg/m$^3$ before treatment. The low-density wood species may further be chosen from the group comprising of softwoods such as *Pinophyta*, such as *Pinaceae*, *Araucariaceae*, *Podocarpaceae*, *Sciadopityaceae*, *Cupressaceae*, *Cepholotaxaceae* and *Taxaceae*, or of hardwoods such as, *Tilia*, *Alnus*, and *Populus*. However, any low-density wood species may be treated according to the present method with an intention to densify and harden said low-density wood species. The hydrophilic polymeric biomaterial may be in the form of a sawn timber, a log, a plank, a board, a veneer, a wafer, and/or a particle.

Thus, the inventors have provided a method that will increase the hardness of the hydrophilic polymeric biomaterial, as well as decrease the elastic spring-back and the set-recovery, as compared to hydrophilic polymeric biomaterial treated with methods of the prior art, or without any pre-treatment.

EXPERIMENTAL SECTION

Materials and Methods

Specimen Preparation

The study was carried out on knot-free sapwood specimens of Scots pine (*Pinus sylvestris* L.) with dimensions of 124 mm (L)×25 mm (T)×18.5 mm (R). The annual ring orientation was within ±15° parallel to the tangential wood surface to be densified. The specimens were kept in a climate chamber at a temperature of 20° C. and 65% relative humidity (RH) until they reached the equilibrium moisture content (EMC). The specimens were grouped into seven categories according to their density, and the specimens belonging to either the highest or the lowest density category were discarded. The specimens were then selected so that each specimen group (Table 1) had the same number of specimens of each density category.

Preparation of Chemicals

The specimens were treated with first generation ILs, with a non-imidazolium-based ionic liquid (IL) (an acid-base conjugate ionic liquid made from amidine- or guanidine-based cations (an organic superbase) combined with a carboxylic acid), or with organic superbases, diluted with ethanol to different concentrations (Table 1). The IL 1-butyl-3-methylimidazolium chloride (Bmim[Cl]), and the organic superbases 1,5-diazabicyclo(4.3.0)non-5-ene (DBN), 1,8-diazabicyclo(5.4.0)undec-7-ene (DBU) and 1,1,3,3-tetramethyl-guanidine (TMG) were purchased from Acros Organics. Another IL was made by mixing DBN with propionic acid in an equimolar ratio, resulting in DBN propionate (DBN[EtCO2H]).

Chemical Pre-Treatment

All specimen groups to be chemically treated were oven dried at 103° C. to an MC of 0% prior to the pre-treatment. The chemical solutions were first applied with a pipette onto the tangential barkside-oriented wood surface to be densified. In order to keep the amount of solution consistent, the content of one pipette filling was distributed over the surfaces of two specimens. Within one minute, the solutions were completely soaked up by the wood. This procedure was repeated three more times for each specimen. In order to encourage the penetration of the chemicals into the wood, the surfaces were punctured with 3-4 mm deep holes with a diameter of about 0.8 mm. Only group 250NDBU (Table 1) was left without holes. After the pre-treatment, the specimens were placed in an oven at a temperature of 60° C. for 14 hours to evaporate the ethanol. Omitting this step would lead to the destruction of the wood during the densification stage due to too high a steam pressure.

Densification Process

The specimens were densified in the radial direction in a press with one of the platens heated and equipped with a water-cooling system. Two or three specimens were densified at the same time. For the first 10 seconds of the process, a low pressure sufficient to maintain proper contact between the wood surfaces and the heated press platen was applied. The pressure was then increased to a level that would only lead to densification if the wood cells were sufficiently softened. Depending on the parameters and the treatment, the target thickness of 14.98 mm (set by metal stops in the press) was achieved after a time between 90 seconds and 240 seconds (Table 1). Regardless of the time taken to reach the target compression, the specimens were kept at the set temperature for a total of 240 seconds, after which the cooling system was started. The press was opened when the press platen temperature reached 60° C., and the spring-back was then measured (see below under "Elastic spring-back"), after which the specimens were kept in an oven at 60° C. until the set-recovery measurements were carried out (see below under "Set-recovery").

Specimen Grouping

Table 1 lists the specimen groups with their respective treatments and densification parameters. Group C150 is the reference group, densified with parameters similar to those commonly used in surface densification procedures. The purpose of groups R270-200 was to study the effect of thermal modification on the spring-back and set-recovery and to separate it from the effect of the chemical pre-treatment. After being densified with the same parameters as group C150, these four groups were put back in the press for 240 s at temperatures between 270° C. and 200° C., corresponding to the densification temperatures of the chemically treated specimens.

TABLE 1

| Specimen group | No. of speciemens | Oven-dry density ± Stdev (kg/m³) | Chemical pre-treatment | CE [wt %] | T [° C.] | MC [%] | P [MPa] | $t_1$ [s] | $t_2$ [s] |
|---|---|---|---|---|---|---|---|---|---|
| C150 | 6 | 438 ± 23 | — | — | 150 | 14.8 | 3.5 | 80 | 90 |
| R270 | 5 | 438 ± 14 | — | — | 270 | 14.8 | 3.5 | 80 | 330 |
| R250 | 5 | 440 ± 20 | — | — | 250 | 14.8 | 3.5 | 80 | 330 |
| R230 | 5 | 437 ± 13 | — | — | 230 | 14.8 | 3.5 | 80 | 330 |
| R200 | 5 | 435 ± 16 | — | — | 200 | 14.8 | 3.5 | 80 | 330 |
| 270BMIM | 10 | 434 ± 16 | Bmim[Cl] | 20 | 270 | 0 | 3.2 | 90 | 240 |
| 270DBNIL | 10 | 435 ± 20 | DBN[EtCO$_2$H] | 20 | 270 | 0 | 3.2 | 90 | 240 |
| 270DBN | 10 | 436 ± 18 | DBN | 20 | 270 | 0 | 3.2 | 90 | 240 |
| 270TMG | 10 | 434 ± 15 | TMG | 20 | 270 | 0 | 3.2 | 90 | 240 |
| 270DBU | 10 | 439 ± 16 | DBU | 20 | 270 | 0 | 3.2 | 90 | 240 |
| 250DBU | 10 | 433 ± 20 | DBU | 20 | 250 | 0 | 3.2 | 120 | 240 |
| 230DBU | 10 | 434 ± 19 | DBU | 20 | 230 | 0 | 3.5 | 150 | 240 |
| 200DBU | 10 | 432 ± 22 | DBU | 20 | 200 | 0 | 4.4 | 230 | 240 |
| 250HDBU | 10 | 444 ± 16 | DBU | 30 | 250 | 0 | 3.2 | 120 | 240 |
| 250LDBU | 10 | 439 ± 20 | DBU | 10 | 250 | 0 | 3.2 | 170 | 240 |
| 250WDBU | 10 | 429 ± 19 | DBU | 20 | 250 | 5.0 | 3.2 | 120 | 240 |
| 250NDBU | 10 | 434 ± 19 | DBU | 20 | 250 | 0 | 3.2 | 120 | 240 |

Test groups:
CE—Concentration in ethanol,
T—Press-platen temperature;
P—Densification pressure;
t1—Time to reach target thickness;
t2—Total time in press before cooling Elastic Spring-Back The elastic spring-back (SB) was determined from measurements made with a digital calliper with a measurement resolution of 0.01 mm and a precision of ±0.03 mm (according to the manufacturer). SB is defined as:

$$SB(\%) = \frac{B'_c - B_c}{B_0 - B_c} \quad [1]$$

where $B_0$ is the original dimension of the specimen in the densification direction before densification, $B_c$ is the target dimension of the specimen after densification (in this case 14.98 mm) and $B'_c$ is the actual dimension of the specimen after densification. The spring-back can thus vary between 0% and 100%, where 0% indicates no spring-back and 100% indicates total spring-back.

Set-Recovery

The set-recovery measurements were carried out on specimens with dimensions of 20 mm (L)×25 mm (T)x≈15 mm (R), cut from the densified specimens. Before the set-recovery procedure the samples were kept in an oven at 60° C. in order to prevent re-moistening. The specimens were measured with a digital calliper after one and two cycles of soaking in water for at least 14 hours at room temperature, followed by oven-drying at 60° C. for 24 hours. The set-recovery (SR) is defined as:

$$SR(\%) = \frac{R'_c - R_c}{R_0 - R_c} \quad [2]$$

where $R_0$ is the oven-dry dimension of the specimen in the densification direction before densification, $R_c$ is the dimension of the specimen after densification and $R'_c$ is the dimension of the densified specimen after the wet-dry cycling. The set-recovery can vary between 0% and 100%, where 0% indicates that there is no set-recovery, i.e. that the compression-set is completely fixed, and 100% indicates that the recovery is total. After the first wet-dry cycle, the specimens exhibited cupping of the densified surface, and for this reason the average value of the maximum and minimum dimension over the surface of each specimen was used for $R'_c$.

With this way of calculating the set-recovery the initial, uncompressed oven-dry dimensions were not known for the specimens densified at a MC of 14.8% or 5.0%. In this case, the oven-dry dimensions of the specimens were assumed to be equal to the average dimensions of all the specimens densified at an MC of 0%. As the standard deviation in the dimensions of these specimens was only 0.07 mm, this assumption appears to be sufficiently accurate.

Brinell Hardness

The Brinell hardness (HB) measurements was measured in accordance with the standard EN 1534, but with several modifications (CEN 2010). A Zwick Roell ZwickiLine 2.5 TS universal testing machine equipped with a 2.5 kN load cell and a steel ball with a diameter (D) of 10 mm was used. The force was increased at a rate of 4 kN per minute to a nominal force (F) of 1 kN, which was held for 25 seconds before being released.

According to the standard, the Brinell hardness is calculated from the diameter of the indentation in the specimen, but the Brinell hardness was calculated from the depth of the indentation. The reason for this modification of the test procedure was that it was difficult to measure the diameter of the indentation in wood. In contrast to steel or other metals, wood does not leave an indentation with a clear circular border because of the anisotropy of its properties. The depth of the indentation (h) can, however, be measured with the hardness testing equipment with high accuracy and precision by. The HB values in this study were used only for comparison between the test groups. Niemz and Stübi (2000) and Laine et al. (2013a) previously implemented a similar approach. Thus, the Brinell hardness (HB) is here defined as:

$$HB = \frac{F}{\pi * D * h} \quad [3]$$

A total of 30 hardness measurements were made on each specimen group, 15 on the densified surface and 15 on the opposite, undensified surface as control measurements. The 30 measurements per group were distributed over five specimens with six measurements per specimen.

Effect of the Treatments on the Colour of the Wood

Colour changes caused by the treatments and by the densification process were assessed in a qualitative way by visual inspection (data not shown). There was some discoloration but in general, the wood treated with the present method was discoloured only superficially to a depth of less than 0.1 mm. Such surface discoloration is easy to plane or sand off before use of the wood, and does not have a negative effect on the usability of the densified wood obtained by the present method.

Data Analysis

All the collected data were processed in Microsoft Excel, after which a principal component analysis (PCA) screening was done using the software package SIMCA provided by Umetrics, Sweden. With the help of PCA, a multivariate data analysis method, it is possible to find correlations in large datasets which are difficult to detect with univariate data analysis methods.

Results and Discussion

This study tested the effect of a pre-treatment with ionic liquids (ILs) or organic superbases on the elastic spring-back, set-recovery and Brinell hardness of surface-densified Scots pine.

Elastic Spring-Back

It has been reported that the spring-back of untreated surface-densified Scots pine is about 50% without a cooling stage after the densification stage (Neyses et al. 2017). With a cooling stage, the spring-back can be reduced to 10-15% (Laine et al. 2013b, Neyses et al. 2017), and this was confirmed in the present study by group C150, which had an average spring-back of 11%. For all other groups, the dimension of the specimen in the densification direction was, within the measurement accuracy, the same as the target compression, and the spring-back can thereby be considered negligible.

Laine et al. (2013c) have proposed that the reduction in spring-back when using a cooling stage in the surface densification of Scots pine is a result of the high temperatures during densification. We propose, however, that the low degree of spring-back is a result of an extremely effective plasticization of the wood modified by the ILs or superbases, in combination with a very low deformation of the unmodified wood volume beneath the modified wood during the densification process.

Set-Recovery

Figure 2:
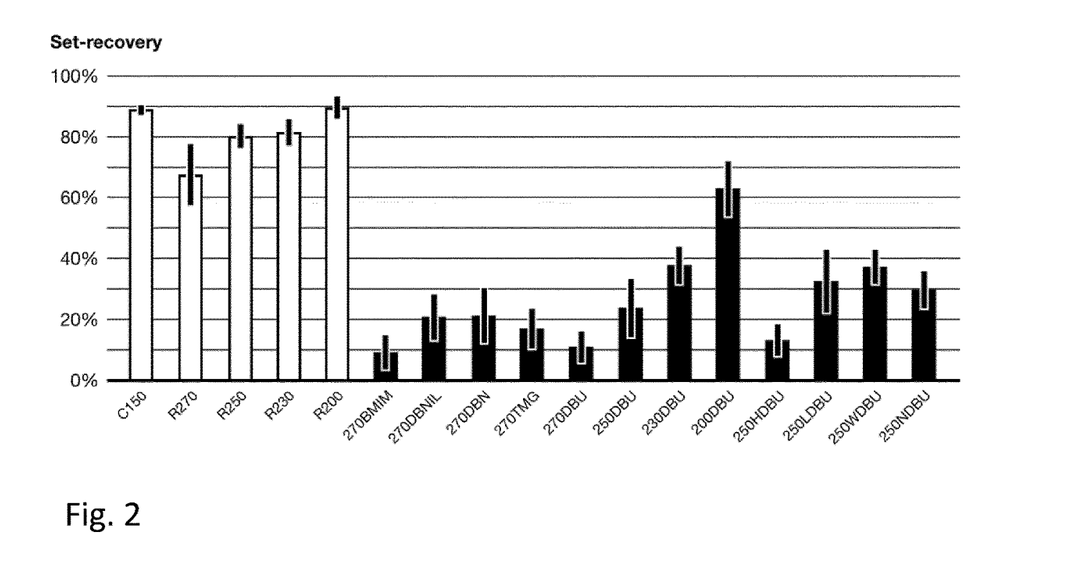
FIG. 2: Overview of the set-recovery. Dark grey bars are untreated specimen groups and light grey bars are chemically treated specimen groups according to Table 1. The error bars show ±1 standard deviation.

FIG. 2 shows the average set-recovery of the untreated specimen groups after two wet-dry cycles. For all the groups treated with the plasticizing liquid, there was no significant difference in set-recovery between the first and second wet-dry cycles, i.e. the set-recovery did not increase after the first wet-dry cycle, meaning that the plasticizing liquid acts as a strong plasticizer, with the densified wood remaining stable over time. For the untreated control groups, there was a slight increase between the first and second wet-dry cycle. The control group (C150) had a set-recovery of 90%, and with increasing densification temperature, the set-recovery could be slightly reduced, to 68% for the group R270. All groups that were treated with the plasticizing liquid exhibited a strong reduction in set-recovery, and at the highest densification temperature it was only 10%—an almost complete elimination.

The reduction in set-recovery can be attributed both to the press-platen temperature and to the chemical treatment, but the set-recovery of the R200-270 groups compared to that of the wood treated with the plasticizing liquid at the corresponding temperatures suggests that the effect of heat, i.e. thermal degradation, was much less than the effect of the chemical treatment/plasticization liquid. It was possible with all the tested plasticization liquids to reduce the set-recovery to less than 20%. Curiously, the in many senses advantageous non-imidazolium-based ionic liquid (IL), and the organic superbases worked as well as the first-generation IL 1-butyl-3-methylimidazolium chloride.

For the DBU treatment, an increase in press-platen temperature, or an increase in chemical concentration reduced the set-recovery. An increase in MC of the specimen before densification (250WDBU) or the absence of punctured holes in the surface to increase the penetration of chemicals (250NDBU) increased the set-recovery. It was not possible to see any influence on the set-recovery of the variation in annual ring orientation in the cross-sections of the specimens.

Figure 3:
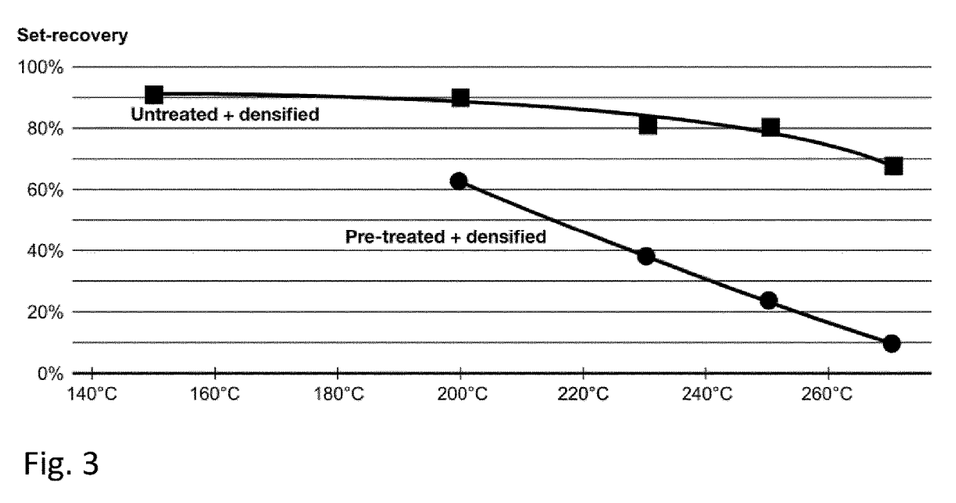
FIG. 3: Average set-recovery as a function of the densification temperature. The dark curve corresponds to groups C150 and R200-270, and the light curve to groups 200-270DBU.

FIG. 3 shows the relationship between the average set-recovery and the densification temperature. The light curve (squares) corresponds to specimens without chemical treatment (C150 and R200-270 groups), and the dark curve to the 270-200DBU groups. The reduction in set-recovery increases with increasing temperature and, in the case of the specimens treated with DBU, the relationship appears to be almost linear.

A comparison of the 250DBU, 250HDBU and 25OLDBU groups, with respectively 20%, 30%, and 10% concentration of DBU in ethanol, indicates that an increase in concentration leads to a reduction in set-recovery, but further studies are needed to determine the precise nature of this relationship.

The set-recovery of group 250WDBU (MC=5%) suggests that moisture is detrimental to the efficacy of the pre-treatment with DBU, as was expected on the basis of published studies on the dissolution of cellulose in ILs (Mäki-Arvela et al. 2010). Zavrel et al. (2009) reported that water molecules create hydrodynamic shells around the IL molecules and that this inhibits direct interactions between the IL and the cellulose. Nevertheless, the decrease in set-recovery was substantial with a reduction from 81% to only 37%.

The surface of the specimens of almost all groups was punctured with small holes in order to facilitate penetration of the chemical solutions into the wood. Surprisingly, the set-recovery of group 250NDBU without holes was only slightly higher than the set-recovery of group 250DBU—which was otherwise treated and densified in the same way. Depending on possible applications of surface-densified wood and their requirements, the puncturing of the surface may thus not be necessary.

Brinell Hardness

FIG. 4 shows the Brinell hardness of undensified and densified specimen surfaces. There was no significant difference in the average Brinell hardness of the undensified surfaces. The densification process resulted in an increase in the hardness of the densified surfaces. Densification without chemical treatment (groups C150 and R270-200) resulted in a two-fold increase in hardness from 13.4 N/mm$^2$ to 26.2 N/mm$^2$, and there were no differences between the groups. This increase in hardness is in line with results from previous studies (Gong et al. 2010, Laine et al. 2013a, Neyses et al. 2017). The chemically treated specimens showed an increase in HB after densification by a factor 2.7, i.e. from 12.9 N/mm$^2$ to 34.4 N/mm$^2$, which is a significant increase over that of the untreated and densified specimens. There were no significant differences in HB between the different groups treated with the plasticizing liquid, indicating again that the more affordable, more easily recoverable, and more environmentally friendly non-imidazolium-based ionic liquid (IL), and superbases function at least as well as the first-generation IL.

Figure 5:
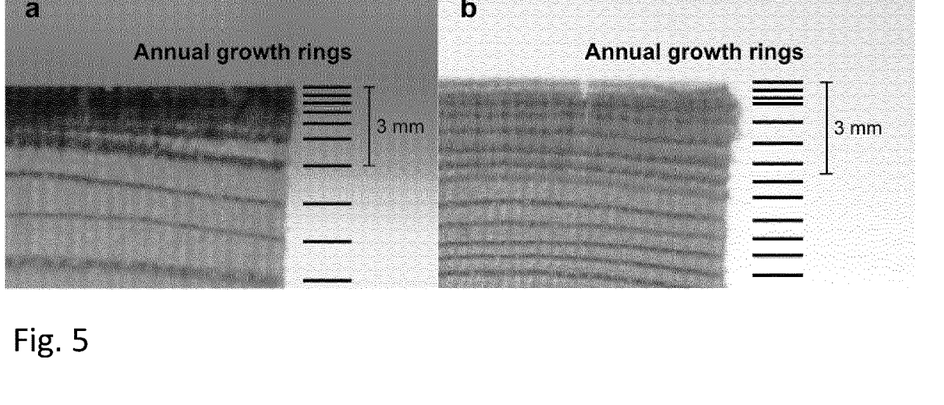
FIG. 5: Densification close beneath to the surface of (a) a chemically treated specimen and (b) an untreated specimen. The horizontal bars show the distance between annual rings.
Figure 6:
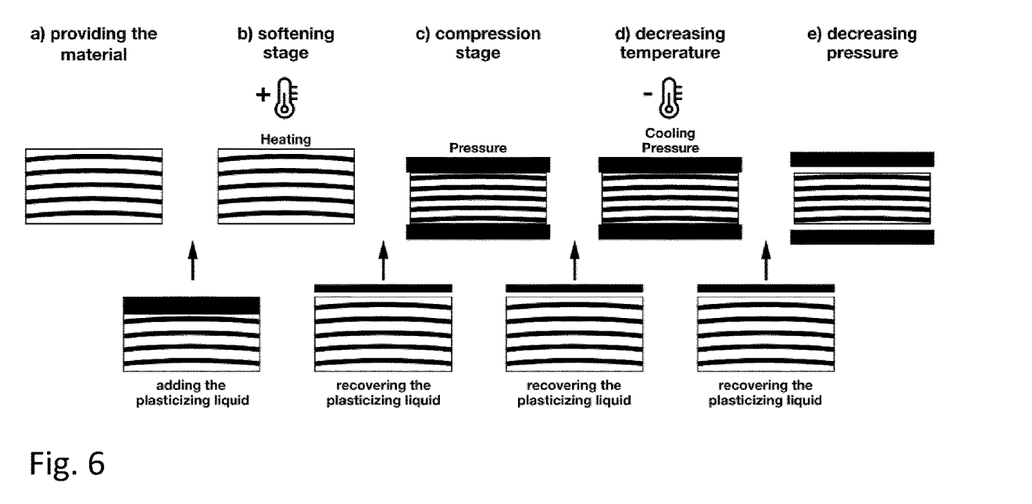
FIG. 6: Densification process flow from stage (a) to (e). It shows the points at which the plasticizing liquid is added to the surface of the hydrophilic polymeric biomaterial to be densified, and at which points in the process it may be recovered.

It appears that the reason for the higher HB of the chemically treated specimens is a more thorough and targeted plasticization than that of the untreated specimens. FIG. 5a shows that, for the chemically treated specimens, the region with the highest level of densification is located at the very surface of the specimen, and in this respect the specimen shown is representative of all the chemically treated specimens. Directly beneath the surface there appears to be a layer approximately 1.2 mm in thickness with a threefold increase in density. The density then gradually decreases towards the core of the specimen. In FIG. 5b, which shows an untreated and densified specimen, it appears that the density peak of these specimens is not located at the very surface, but is somewhat below the surface. This could be because by the heated press platen dries the specimen surface, and thus inhibits the plasticization of this region. For the chemically treated specimens, this phenomenon is not relevant because their plasticization does not rely on moisture. Another observation supporting our hypothesis is the bulging of the side surfaces in the densified area (FIG. 5): the chemically treated specimens bulge out at the very surface, while the untreated ones bulge out slightly below the surface.

As the Brinell hardness method is a volume-based measurement, it appears not to be representative of the perceived surface hardness of the specimens. In theory, the observed three-fold increase in density should result in a threefold increase in hardness, which was not confirmed by the calculated HB values. Perhaps another type of hardness or scratch resistance measurement method would provide more meaningful results—at least, with respect to the planned use of the densified wood. For this reason, we think it could be worthwhile to study the relationship between different hardness and scratch resistance measurement methods and surface-densified wood treated in different ways. This is especially important with regard to possible applications of surface-densified wood products.

Conclusion

The ionic liquids (ILs) 1-butyl-3-methylimidazolium chloride and 1,5-diazabicyclo(4.3.0)non-5-enium propionate and the organic superbases 1,5-diazabicyclo(4.3.0) non-5-ene, 1,8-diazabicyclo(5.4.0)undec-7-ene and 1,1,3,3-tetramethylguanidine have been shown to be strong plasticizers, which can reduce or even eliminate the elastic and set-recovery components of deformation of surface-densified wood. The elastic spring-back was eliminated, and the set-recovery after two wet/dry cycles in water was reduced to as low a value as 10% (100% means full recovery of the deformation). The superbases and non-imidazolium-based ionic liquid (IL), such as acid base conjugate ILs made from amidine- or guanidine-based cations combined with a carboxylic acid, have an effect more or less equal to that of the first generation ILs, which is an encouraging result, as those substances are arguably more attractive with regard to industrial implementation.

The above discussed results using non-imidazole-based ILs made from amidine- or guanidine-based cations combined with a carboxylic acid will very likely apply also when using other non-imidazole-based ILs. Examples of such non-imidazolium-based ILs that have shown a similar capability of dissolving cellulose as imidazolium-based ILs are carboxylate-based ILs (Kasprzak et al. 2019); quaternary ammonium ILs (Diez et al. 2019)—which are favourable from an environmental perspective, as they are derived from grass, softwood or hardwood lignin; biodegradable lutidinium-based ILs (Samikannu et al. 2018); or ammonium- and pyridinium-based ILs (Rieland & Love 2020). In general, the cellulose dissolving ability of these non-imidazole-based ILs is associated with their ability to form hydrogen bonds with the hydroxyl groups of the cellulose chains. It is suggested that the anion starts the reaction, swelling the biomaterial and allowing the usually bulkier cations to form hydrogen bonds, as well, and thereby forming a "solvation cage", creating repulsion between the cellulose chains (Rieland & Love 2020).

The chemical treatment resulted in a Brinell hardness (HB) 1.3 times higher than that of the untreated and densified specimens, and in a 2.7 times increase relative to that of the undensified surface. This means that the HB of the chemically treated Scots pine approaches a level similar to that of oak, a wood species widely used for high-quality wooden flooring.

The process described here can be seen as a precursor to the development of a continuous open-system surface densification process. A closed system is not necessary and both the chemical treatment and the densification have the potential to be performed in a continuous manner. Further studies are however needed to optimize the treatment.

REFERENCES

Diez, V., DeWeese, A., Kalb, R. S., Blauch, D. N., & Socha, A. M. (2019). Cellulose Dissolution and Biomass Pretreatment Using Quaternary Ammonium Ionic Liquids Prepared from H-, G-, and S-Type Lignin-Derived Benzaldehydes and Dimethyl Carbonate. Industrial & Engineering Chemistry Research, 58(35), 16009-16017.

Dominguez de Maria, P. (2014). Recent trends in (ligno) cellulose dissolution using neoteric solvents: switchable, distillable and bio-based ionic liquids. Journal of Chemical Technology and Biotechnology, 89(1), 11-18.

Fang, C. H., Mariotti, N., Cloutier, A., Koubaa, A. & Blanchet, P. (2012). Densification of wood veneers by compression combined with heat and steam. European Journal of Wood and Wood Products, 70(1-3), 155-163.

Foksowicz-Flaczyk, J. & Walentowska, J. (2013). Antifungal activity of ionic liquid applied to linen fabric. International Biodeterioration & Biodegradation, 84, 412-415.

Gabrielli, C. P. & Kamke, F. A. (2010). Phenol-formaldehyde impregnation of densified wood for improved dimensional stability. Wood Science and Technology, 44(1), 95-104.

Gong, M., Lamason, C. & Li, L. (2010). Interactive effect of surface densification and post-heat-treatment on aspen wood. Journal of Materials Processing Technology, 210 (2), 293-296.

Hanabusa, H., Izgorodina, E. I., Suzuki, S., Takeoka, Y., Rikukawa, M. & Yoshizawa-Fujita, M. (2018). Cellulose-dissolving protic ionic liquids as low cost catalysts for direct transesterification reactions of cellulose. Green Chemistry, 20(6), 1412-1422.

Inoue, M., Norimoto, M., Otsuka, Y. & Yamada, T. (1990). Surface compression of coniferous wood lumber. I. A new technique to compress the surface layer. Mokuzai Gakkaishi (Journal of the Japan Wood Research Society), 36(11), 969-975.

Inoue, M., Norimoto, M., Otsuka, Y., & Yamada, T., M. Tanahashi, M. & Rowell, R. M. (1993). Steam or heat fixation of compressed wood. Wood and Fiber Science, 25(3), 224-235.

Inoue, M., Sekino, N., Morooka, T., Rowell, R. M. & Norimoto, M. (2008). Fixation of compressive deformation in wood by pre-steaming. Journal of Tropical Forest Science, 273-281.

Ishikawa, T. (2009). Superbases for organic synthesis: guanidines, amidines, phosphazenes and related organocatalysts. John Wiley & Sons, Ltd.

Kasprzak, D., Krystkowiak, E., Stęniak, I., & Galiński, M. (2019). Dissolution of cellulose in novel carboxylate-based ionic liquids and dimethyl sulfoxide mixed solvents. European Polymer Journal, 113, 89-97.

Khakalo, A., Tanaka, A., Korpela, A., Hauru, L. K., & Orelma, H. (2019). All-wood composite material by partial fiber surface dissolution with an ionic liquid. ACS Sustainable Chemistry & Engineering, 7(3), 3195-3202.

Khalil, H. A., Dungani, R., Mohammed, I. A., Hossain, M. S., Aprilia, N. S., Budiarso, E. & Rosamah, E. (2014). Determination of the Combined Effect of Chemical Modification and Compression of Agatis Wood on the Dimensional Stability, Termite Resistance, and Morphological Structure. BioResources, 9(4), 6614-6626.

Kilpelainen, I., Xie, H., King, A., Granstrom, M., Heikkinen, S. & Argyropoulos, D. S. (2007). Dissolution of wood in ionic liquids. Journal of Agricultural and Food Chemistry, 55(22), 9142-9148.

King, A. W., Asikkala, J., Mutikainen, I., Järvi, P. & Kilpeläinen, I. (2011). Distillable acid-base conjugate ionic liquids for cellulose dissolution and processing. Angewandte Chemie International Edition, 50(28), 6301-6305.

Kutnar, A., Sandberg, D. & Haller, P. (2015). Compressed and moulded wood from processing to products. Holzforschung, 69(7), 885-897.

Laine, K. (2014). Improving the properties of wood by surface densification. Doctoral dissertation. Aalto University Publication Series.

Laine, K., Rautkari, L. & Hughes, M, (2013a). The effect of process parameters on the hardness of surface densified Scots pine solid wood. European Journal of Wood and Wood Products, 71, 13-16.

Laine, K., Rautkari, L., Hughes, M. & Kutnar, A. (2013b). Reducing the set-recovery of surface densified solid Scots pine wood by hydrothermal post-treatment. European Journal of Wood and Wood Products, 71(1), 17-23.

Laine, K., Segerholm, K., Wålinder, M., Rautkari, L., Ormondroyd, G., Hughes, M. & Jones, D. (2013c). Micromorphological studies of surface densified wood. Journal of Materials Science, 49(5), 2027-2034

Lamason, C. & Gong, M. (2007). Optimization of pressing parameters for mechanically surface-densified aspen. Forest Products Journal, 57(10), 64.

Miyafuji, H. & Fujiwara, Y. (2013) Fire resistance of wood treated with various ionic liquids (ILs). Holzforschung, 67(7), 787-793.

Mäki-Arvela, P., Anugwom, I., Virtanen, P., Sjöholm, R. & Mikkola, J. P. (2010). Dissolution of lignocellulosic materials and its constituents using ionic liquids—a review. Industrial Crops and Products, 32(3), 175-201.

Navi, P. & Heger, F. (2004). Combined densification and thermo-hydro-mechanical processing of wood. Materials Research Society, Bulletin, 29(5), 332-336.

Navi, P. & Sandberg, D. (2012). Thermo-Hydro-Mechanical Processing of Wood, EPFL Press, Lausanne, Switzerland.

Navi, P. & Pizzi, A. (2014). Property changes in thermo-hydro-mechanical processing. Holzforschung, 69(7), 863-873

Neyses, B. (2016). Surface-Densified Wood—From Laboratory-Scale Research Towards a Competitive Product. Licentiate Thesis, Lulea University of Technology.

Neyses, B., Hagman, O., Sandberg, D. & Nilsson, A. (2016). Development of a continuous wood surface densification process: the roller pressing technique. In: International Convention of Society of Wood Science and Technology: Forest Resource and Products: Moving Toward a Sustainable Future (pp. 17-24). Society of Wood Science and Technology.

Neyses, B., Rautkari, L., Yamamoto, A. & Sandberg, D. (2017). Pre-treatment with sodium silicate, sodium hydroxide, ionic liquids or methacrylate resin to reduce the set-recovery and increase the hardness of surface-densified Scots pine. iForest-Biogeosciences and Forestry, 10(5), 857-864.

Niemz, P. & Stübi, T. (2000). Investigations of hardness measurements on wood based materials using a new universal measurement system. In: Proceedings of the symposium on wood ma-chining, properties of wood and wood composites related to wood machining, Vienna, Austria.

Ou, R., Xie, Y., Wang, Q., Sui, S. & Wolcott, M. P. (2014). Thermoplastic deformation of poplar wood plasticized by ionic liquids measured by a nonisothermal compression technique. Holzforschung, 68(5), 555-566.

Parviainen, A., King, A. W., Mutikainen, I., Hummel, M., Selg, C., Hauru, L. K., Sixta, H. & Kilpelainen, I. (2013). Predicting cellulose solvating capabilities of acid-base conjugate ionic liquids. ChemSusChem, 6(11), 2161-2169.

Parviainen, A. P. (2016). Acid-base conjugate ionic liquids in lignocellulose processing: synthesis, properties and applications. Doctoral thesis. Laboratory of Organic Chemistry, Department of Chemistry, Faculty of Science, University of Helsinki, Finland.

Patachia, S., Croitoru, C. & Friedrich, C. (2012). Effect of UV exposure on the surface chemistry of wood veneers treated with ionic liquids. Applied Surface Science, 258 (6), 723-729.

Pernak, J., Zabielska-Matejuk, J., Kropacz, A. & Foksowicz-Flaczyk, J. (2004). Ionic liquids in wood preservation. Holzforschung, 58, 286-291.

Pfriem, A., Dietrich, T. & Buchelt, B. (2012). Furfuryl alcohol impregnation for improved plasticization and fixation during the densification of wood. Holzforschung, 66(2), 215-218.

Pizzi, A., Leban, J. M., Zanetti, M., Pichelin, F., Wieland, S. & Properzi, M. (2005). Surface finishes by mechanically induced wood surface fusion. Holz als Roh-und Werkstoff, 63(4), 251-255.

Rautkari, L., Properzi, M., Pichelin, F. & Hughes, M. (2009). Surface modification of wood using friction. Wood Science and Technology, 43(3-4), 291-299.

Rieland, J. M., & Love, B. J. (2020). Ionic liquids: A milestone on the pathway to greener recycling of cellulose from biomass. Resources, Conservation and Recycling, 155, 104678.

Samikannu, R., Shukla, S. K., Samikannu, A., & Mikkola, J. P. (2019). Lutidinium-based ionic liquids for efficient dissolution of cellulose. New Journal of Chemistry, 43(5), 2299-2306.

Sandberg, D., Haller, P. & Navi, P. (2013). Thermo-hydro-mechanical (THM) wood treatments. Wood Material Science and Engineering, 8(1),64-88.

Schuerch, C., Burdick, M. P. & Mandalik, M. (1966). Liquid ammonia-solvent combinations in wood plasticization. Chemical treatments. Industrial & Engineering Chemistry Product Research and Development, 5(2), 101-105.

Stamm, A. J. (1964). Wood and Cellulose Science. The Ronald Press Company, New York, Swatloski, R. P., Spear, S. K., Holbrey, J. D. & Rogers, R. D. (2002). Dissolution of cellulose with ionic liquids. Journal of the American Chemical Society, 124(18), 4974-4975.

Tarkow, H. & Seborg, R. (1968). Surface densification of wood. Forest Products Journal, 18(9), 104-107.

Zavrel, M., Bross, D., Funke, M., Büchs, J. & Spiess, A. C. (2009). High-throughput screening for ionic liquids dissolving (ligno-) cellulose. Bioresource Technology, 100 (9), 2580-2587.

Zhang, J., Wu, J., Yu, J., Zhang, X., He, J. & Zhang, J. (2017). Application of ionic liquids for dissolving cellulose and fabricating cellulose-based materials: state of the art and future trends. Materials Chemistry Frontiers, 1(7), 1273-1290.

The invention claimed is:

1. A continuous, half-continuous or static method of plasticizing and densifying hydrophilic polymeric biomaterials, said hydrophilic polymeric biomaterial having at least one surface, comprising the steps of:
   (a) providing the hydrophilic polymeric biomaterial;
   (b) softening said surface of the hydrophilic polymeric biomaterial to be compressed by applying heat to increase the temperature of the hydrophilic polymeric biomaterial;
   (c) compressing the hydrophilic polymeric biomaterial by applying an elevated pressure onto the softened surface of said hydrophilic polymeric biomaterial obtained in step (b) at an elevated temperature for a pre-determined period of time;
   (d) decreasing the temperature applied to the hydrophilic polymeric biomaterial; and
   (e) decreasing the pressure applied to the hydrophilic polymeric biomaterial;
   wherein:
   a plasticizing liquid is added to said surface of the hydrophilic polymeric biomaterial to be densified before step (b), such that said liquid penetrates said surface during step (b), and
   the plasticizing liquid is a non-imidazolium-based ionic liquid (IL), an organic superbase or a Deep Eutectic Solvent (DES).

2. The method according to claim 1, wherein the non-imidazolium-based ionic liquid (IL) is made from amidine— or guanidine-based cations combined with a carboxylic acid.

3. The method according to claim 1, wherein the plasticizing liquid is recovered from the hydrophilic polymeric biomaterial before, during or after the compression thereof.

4. The method according to claim 1, wherein step (b) is performed by applying water steam and/or heat to the surface of the hydrophilic polymeric biomaterial for a period of time sufficient to soften said surface to a predetermined depth.

5. The method according to claim 4, wherein step (b) is performed by direct heating, hot plate heating, steam heating, boiling in water, or dielectric heating.

6. The method according to claim 1, wherein step (b) further comprises puncturing the surface of the hydrophilic polymeric biomaterial at multiple locations to provide multiple punctuations on said surface, in order to facilitate the penetration of the plasticizing liquid into the material to a predetermined depth.

7. The method according to claim 6, wherein the punctuations comprise holes that have a depth of 1-5 mm, said holes having a diameter of about 0.1-1.0 mm.

8. The method according to claim 1, wherein the elevated temperature in step (c) is within the range of about 80-270° C.

9. The method according to claim 1, wherein the hydrophilic polymeric biomaterial is wood, a wood-based material, and/or other lignocellulosic materials.

10. The method according to claim 1, wherein the hydrophilic polymeric biomaterial is of a low-density wood species, and wherein said low-density wood species is a low-density softwood or a low-density hardwood.

11. The method according to claim 10, wherein the low-density wood species is chosen from a species having a dry density that is lower than 600 kg/m$^3$ before treatment.

12. The method according to claim 1, wherein the hydrophilic polymeric biomaterial is in the form of a sawn timber, a log, a plank, a board, a veneer, a wafer and/or a particle.

13. The method according to claim 1, wherein the hydrophilic polymeric biomaterial has at least one surface and a core, and said hydrophilic polymeric biomaterial is plasticized and densified on any one or all surfaces thereof.

14. Densified hydrophilic polymeric biomaterial, wherein said hydrophilic polymeric biomaterial has been plasticized and densified by the method according to claim 1.

15. The densified hydrophilic polymeric biomaterial according to claim 13, wherein substantially no plasticizing liquid is present in the densified hydrophilic polymeric biomaterial.

* * * * *

UNITED STATES PATENT AND TRADEMARK OFFICE
CERTIFICATE OF CORRECTION

PATENT NO. : 12,269,929 B2
APPLICATION NO. : 17/595368
DATED : April 8, 2025
INVENTOR(S) : Dick Sandberg and Benedikt Neyses Page 1 of 1

It is certified that error appears in the above-identified patent and that said Letters Patent is hereby corrected as shown below:

In the Specification

Column 7; Line 20, "superbases (Ichikawa 2009)" should read --superbases (Ishikawa 2009)--

Signed and Sealed this
Twenty-seventh Day of May, 2025

Coke Morgan Stewart
*Acting Director of the United States Patent and Trademark Office*